(12) United States Patent
Pana

(10) Patent No.: US 12,050,113 B1
(45) Date of Patent: Jul. 30, 2024

(54) WIRELESS VEHICLE LEVELING SYSTEM

(71) Applicant: Florin Alexandru Pana, Bucharest (RO)

(72) Inventor: Florin Alexandru Pana, Bucharest (RO)

( * ) Notice: Subject to any disclaimer, the term of this patent is extended or adjusted under 35 U.S.C. 154(b) by 0 days.

(21) Appl. No.: 18/371,265

(22) Filed: Sep. 21, 2023

(51) Int. Cl.
*G01C 9/06* (2006.01)
*B60P 3/36* (2006.01)
*F21V 23/04* (2006.01)

(52) U.S. Cl.
CPC .............. *G01C 9/06* (2013.01); *B60P 3/36* (2013.01); *F21V 23/0471* (2013.01)

(58) Field of Classification Search
CPC .......... G01C 9/06; B60P 3/36; F21V 23/0471
See application file for complete search history.

(56) References Cited

U.S. PATENT DOCUMENTS

| | | | | |
|---|---|---|---|---|
| 5,136,784 A * | 8/1992 | Marantz | ................... | G01C 9/16 33/366.27 |
| 5,881,468 A * | 3/1999 | Baumann | ................. | G01C 9/28 33/383 |
| 6,526,668 B1 * | 3/2003 | Beckhart | ................... | G01C 9/06 33/366.11 |
| 6,584,385 B1 * | 6/2003 | Ford | .................. | B60G 17/0161 180/41 |
| 7,025,361 B1 * | 4/2006 | Erickson | ................... | B60S 9/02 280/6.154 |
| 7,261,304 B2 * | 8/2007 | Trudeau | ............. | B60G 17/0155 280/5.514 |
| 7,370,428 B2 * | 5/2008 | Decker, Jr. | ............... | G01C 9/06 33/366.11 |
| 7,786,883 B1 * | 8/2010 | Davison, III | ............ | B60P 3/36 33/366.11 |
| 8,006,397 B2 * | 8/2011 | Schubert | .................. | G01C 9/06 33/366.11 |
| 9,421,907 B2 * | 8/2016 | Carpani | .................... | G01C 9/00 |
| 9,434,307 B2 * | 9/2016 | Alexander | ............ | B60K 35/00 |
| 9,454,897 B2 * | 9/2016 | Cattermole | ............ | G08C 17/02 |
| 9,518,823 B2 * | 12/2016 | Hill | ....................... | G01C 15/004 |
| 9,933,259 B1 * | 4/2018 | Vargas | ..................... | G01C 9/26 |
| 10,214,940 B2 * | 2/2019 | Knudsen | .................. | G01C 5/00 |
| 10,890,925 B2 * | 1/2021 | Leonard | ............... | G05D 1/0016 |
| D949,747 S * | 4/2022 | Alexandru | ................... | D12/106 |
| 11,754,393 B2 * | 9/2023 | Gould | .................. | G01C 15/008 33/228 |
| 2007/0180719 A1 * | 8/2007 | Donnelly | .................. | B60S 9/02 33/366.11 |

* cited by examiner

*Primary Examiner* — John Fitzgerald
*Assistant Examiner* — Tania Courson
(74) *Attorney, Agent, or Firm* — Bay State IP, LLC

(57) ABSTRACT

The present disclosure provides a wireless vehicle leveling system. The wireless vehicle leveling system comprises a base module and a remote module. The base module comprising a plurality of extendable legs incorporating one or more first LED indicators. The remote module is configured to perform wireless communication with the base module. The remote module comprising one or more second LED indicators. The plurality of extendable legs is extendable along predefined directions and is configured to capture a level data associated with a vehicle along each of the predefined directions. Both the one or more first LED indicators and the one or more second LED indicators are configured to simultaneously indicate a leveling status of the vehicle.

12 Claims, 9 Drawing Sheets

WIRELESS VEHICLE LEVELING SYSTEM

FIELD OF THE INVENTION

The present invention relates to leveling systems and processes for leveling vehicles, and more specifically, to a wireless vehicle leveling system designed to accurately detect and adjust the inclination of various types of vehicles, including but not limited to recreational vehicles (RVs), travel trailers, and campers.

BACKGROUND OF INVENTION

The following description includes information that may be useful in understanding the present disclosure. It is not an admission that any of the information provided herein is prior art or relevant to the presently claimed invention, or that any publication specifically or implicitly referenced is prior art.

Traditional methods of leveling vehicles, particularly recreational vehicles (RVs), travel trailers, and campers, have often been laborious and time-consuming, requiring installation of permanent leveling systems within the vehicle. These installations demand both technical expertise and the commitment of significant time and resources.

The conventional leveling systems necessitates complex installation procedures. Further, a significant challenge arises when attempting to level a travel trailer or camper from the outside, particularly when the operator is situated in a towing vehicle such as a truck. In such scenarios, it may be difficult and impractical to repeatedly check the leveling status of the device located inside the travel trailer, especially when the trailer's position is frequently adjusted. To address this issue, the invention incorporates a remote monitoring feature, enabling users to conveniently assess the leveling status of the device from both internal and external vantage points.

To overcome the above challenges associated with vehicle leveling, there is a need for a portable device, user-friendly solution that streamlines the leveling process while ensuring accuracy.

SUMMARY OF INVENTION

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one aspect, the present disclosure provides a wireless vehicle leveling system. The wireless vehicle leveling system comprises a base module and a remote module. The base module comprising a plurality of extendable legs incorporating one or more first LED indicators. The remote module is configured to perform wireless communication with the base module. The remote module comprising one or more second LED indicators. The plurality of extendable legs is adapted to extend along predefined directions and is configured to indicate a level information associated with a vehicle along each of the predefined directions. Both the one or more first LED indicators and the one or more second LED indicators are configured to simultaneously indicate a leveling status of the vehicle.

In one exemplary embodiment of the present disclosure, wherein the vehicle is selected from at least one of: recreational vehicles (RVs), travel trailers, and campers.

In another exemplary embodiment of the present disclosure, the predefined directions comprise a right direction, a left direction, a front direction, and a rear direction.

In yet another exemplary embodiment of the present disclosure, the level data comprises vehicle's height level along each of the predefined directions.

In yet another exemplary embodiment of the present disclosure, the base module is installed on vehicle's floor to determine the level data associated with the vehicle.

In yet another exemplary embodiment of the present disclosure, the remote module is configured to monitor the leveling status from outside of the vehicle.

In yet another exemplary embodiment of the present disclosure, the one or more first LED indicators and the one or more second LED indicators are configured to indicate a red light when the vehicle is in an imbalanced position along a respective predefined direction.

In yet another exemplary embodiment of the present disclosure, the one or more first LED indicators and the one or more second LED indicators are configured to indicate a yellow light when the vehicle is close to a balanced position along a respective predefined direction.

In yet another exemplary embodiment of the present disclosure, the one or more first LED indicators and the one or more second LED indicators are configured to indicate a green light when the vehicle is in a balanced position along a respective predefined direction.

In one exemplary embodiment of the present disclosure, the communication module comprises a Bluetooth or a Wi-Fi.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Further aspects and advantages of the present disclosure will be readily understood from the following detailed description with reference to the accompanying drawings, where like reference numerals refer to identical or functionally similar elements throughout the separate views. The figures together with the detailed description below, are incorporated in and form part of the specification, and serve to further illustrate the aspects and explain various principles and advantages, in accordance with the present disclosure wherein.

Figure 1:
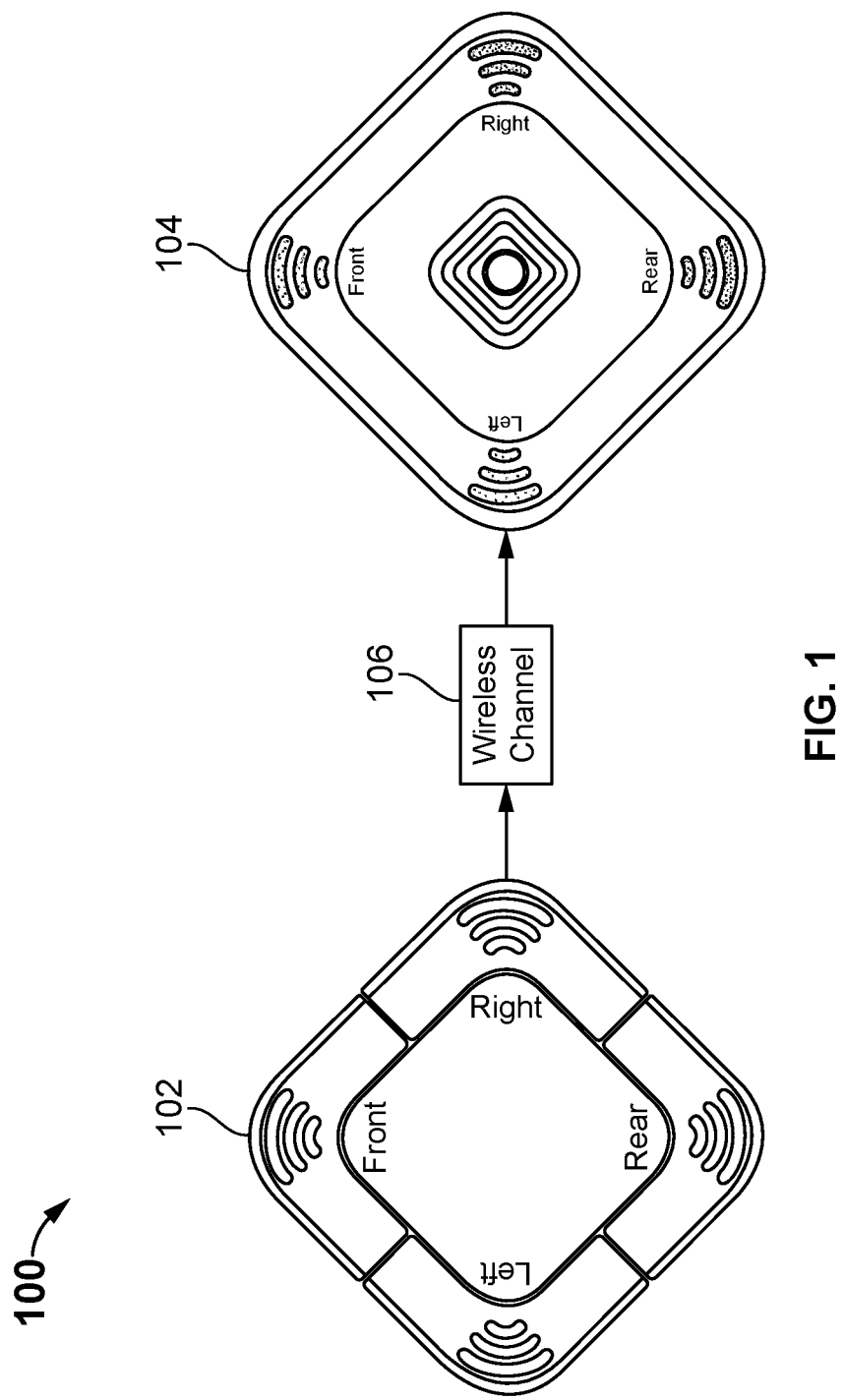
FIG. 1 illustrates a wireless vehicle leveling system 100 for leveling a vehicle, according to embodiments of the disclosed invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the scope of the present disclosure.

DETAILED DESCRIPTION

There are a great many possible implementations of the invention, too many to describe herein. Some possible implementations are described below. In the following description, for purposes of explanation, numerous specific details are set forth in order to provide a thorough understanding thereof. It should be clear, however, that the innovation can be practiced without various specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, any particular embodiment need not have all the aspects or advantages described herein. Thus, in various embodiments, any of the features described herein from different embodiments may be combined. It cannot be emphasized too strongly, however, that these are descriptions of implementations of the invention, and not descriptions of the invention, which is not limited to the detailed implementations described in this section but is described in broader terms in the claims.

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

In the present disclosure, the term "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", "include", "including", or any other variations thereof, are intended to cover a non-exclusive inclusion, such that a device that comprises a list of components does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus.

The novel features which are believed to be characteristic of the disclosure, both as to its system and method of operation, together with further objects and advantages will be better understood from the following description when considered in connection with the accompanying Figures. It is to be expressly understood, however, that each of the Figures is provided for the purpose of illustration and description only and is not intended as a definition of the limits of the present disclosure.

The present disclosure aims to overcome the issues associated with conventional leveling systems often require complex installations, technical expertise, and do not provide a convenient way to monitor the leveling process from both inside and outside the vehicle.

To address these issues, the present disclosure provides a novel vehicle leveling system that may accurately determine inclination/declination of a vehicle, provide real-time feedback on its leveling status, and offer a portable solution for both drivable and towable vehicles, such as recreational vehicles (RVs), travel trailers, and campers.

FIG. 1 illustrates a wireless vehicle leveling system 100 for leveling a vehicle, according to embodiments of the disclosed invention. The wireless vehicle leveling system 100 of the present invention is designed to assist the users in leveling different types of vehicles such as RV, travel trailer, camper and more by detecting the height required to reach a level position. An advantage of the system 100 is that it provides information about the direction in which the height is required to level the vehicle. The wireless vehicle leveling system 100 is adaptable for use with both drivable and towable vehicles and enabling simultaneous monitoring of the vehicle's level along multiple axes, thereby optimizing the vehicle setup process, minimizing setup time, and enhancing safety.

More specifically, the system 100 includes a base module 102 and a remote module 104. The base module 102 also referred to as the first module is installed with the vehicle. In one non-limiting embodiment of the present disclosure, the base module 102 may be centrally placed on a vehicle floor to serve as a key component of the leveling system 100. In another non-limiting embodiment of the present disclosure, the first module 102 may be placed at any location on the vehicle floor.

Figure 2:
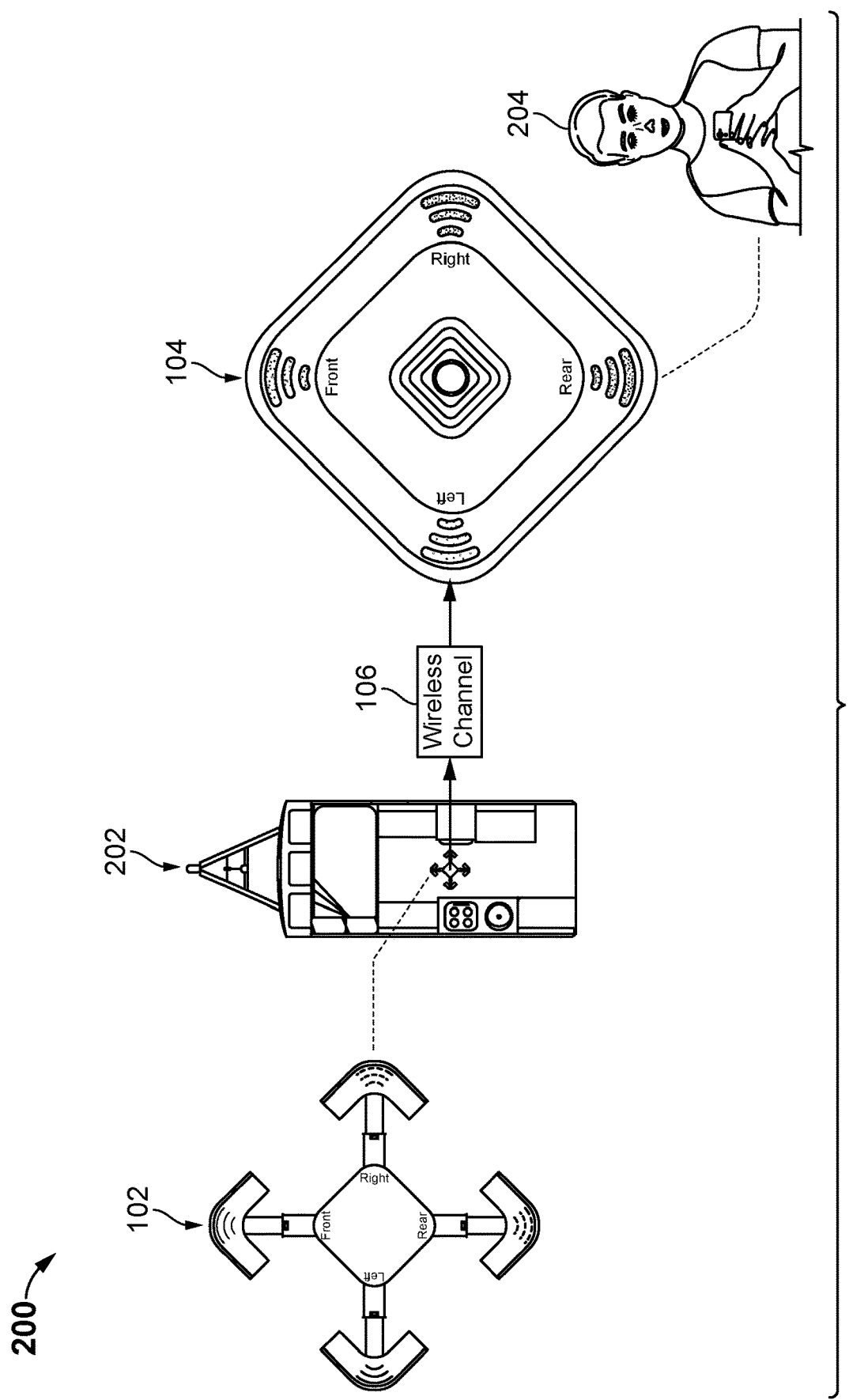
FIG. 2 illustrates an exemplary environment in which the wireless vehicle leveling system 100 is used for leveling a vehicle in accordance with the disclosed architecture.

The remote module 104 also referred to as the second module is wirelessly connected to the first module 102 via a wireless communication channel 106 such as Bluetooth, WiFi or any short range or long range wireless communication channel. The second module 104 may be carried by a user (as shown in FIG. 2) to monitor a vehicle's level along multiple axes. By way of example, the user 104 may be any individual such as an operator of the vehicle.

FIG. 2 illustrates an exemplary environment in which the wireless vehicle leveling system 100 is used for leveling a vehicle in accordance with the disclosed architecture. As depicted in the environment 200, the first module 102 is installed with the vehicle 202. The second module 104 is carried by the user 204 for monitoring the level status of the vehicle 202.

Figure 3:
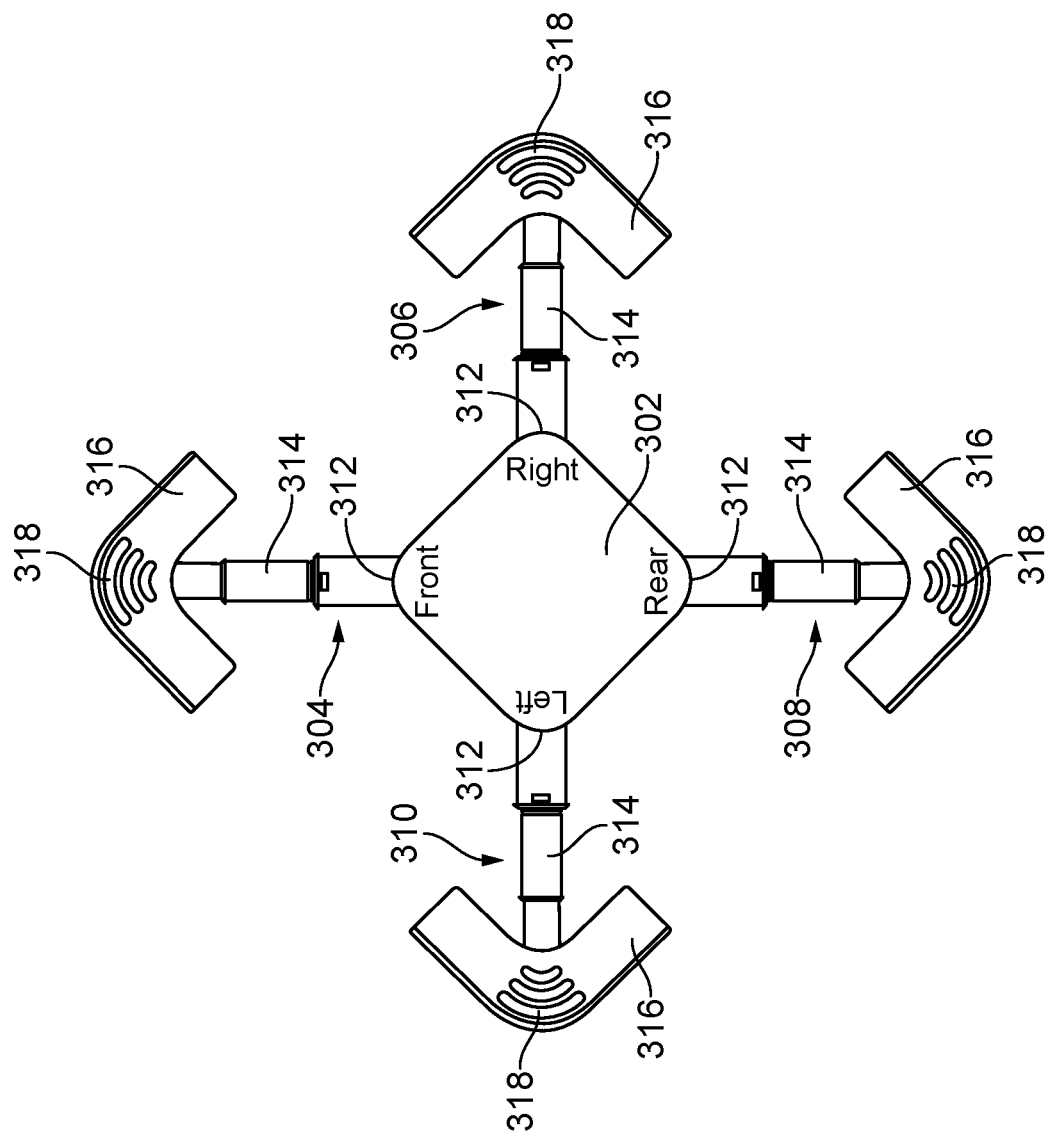
FIG. 3 illustrates a perspective view of the base module of the wireless vehicle leveling system in an extended position, in accordance with an embodiment of the present disclosure.

Referring now to FIG. 3, base module 102 includes a central housing 302 and four extendable legs 304-310 extending outwards from the central housing 302. The housing 302 is preferably square with rounded corners 312. Each extendable leg is similar in size and shape and includes a telescoping longitudinal portion 314 and a distal end 316 which is conformed to the shape of rounded corner 312 of the central housing 302. The housing 302 is adapted to store a plurality of electronic components and sensors for allowing the base module 102 to monitor level of a vehicle in which the base module 102 is positioned.

The base module 102 is adapted to be in an extended position (Arrow A, FIG. 3) as illustrated in FIG. 3 in which the legs 304-310 are extended from the housing 302. The base module 102 can also be set in a standard position (Arrow B, FIG. 4) where the legs 304-310 are in a retracted position and the distal end 316 of each leg adheres to the corresponding corner 312 of the housing 302.

Each leg of the base module 102 is extendable along a predefined direction. The predefined directions encompass key orientations, including but not limited to left, right, front, and rear directions. As an example, the leg 304 may indicate front direction, the leg 306 may indicate right direction, the leg 308 may indicate rear direction and the leg 310 may indicate left direction relative to the housing 302 of the base module 102. The housing 302 includes an indicia for each direction which corresponds to the extendable leg. As illustrated, "Front" indicia corresponds to the front direction leg 304, "Right" indicia corresponds to the right direction leg 306, "Rear" indicia corresponds to the rear direction leg 308 and the "Left" indicia corresponds to the left direction leg 310.

Each leg of the base module 102 includes one or more LED indicators 318 at the distal end 316 thereof. In different embodiments, the LED indicators 318 may be solar powered or can be powered using electrical power from the built-in battery (not shown) of the base module 102.

The LED indicators 318 are adapted to illuminate in different colors wherein each color indicates a level indication in a particular direction of the vehicle used in conjunction with the base module 102. In the preferred embodiment, LED indicators of each extendable leg function independently from the LED indicators of other legs and can illuminate in different or same colors.

In the preferred embodiment, the one or more LED indicators of each leg may illuminate in the green color to indicate that the vehicle is level or in a balanced position along the respective predefined direction indicated by the corresponding leg. In another illustrative scenario, the one or more first LED indicators may illuminate in the red color to indicate that the vehicle is in an imbalanced position along the respective predefined direction. Yellow color of the LED indicators indicate that the vehicle is almost level in the predefined direction indicated by the leg. The use of color coding of LED indicators provides users with a quick and intuitive visual reference, enabling users to easily ascertain the status of the vehicle's level without the need for complex or detailed analysis.

Figure 4:
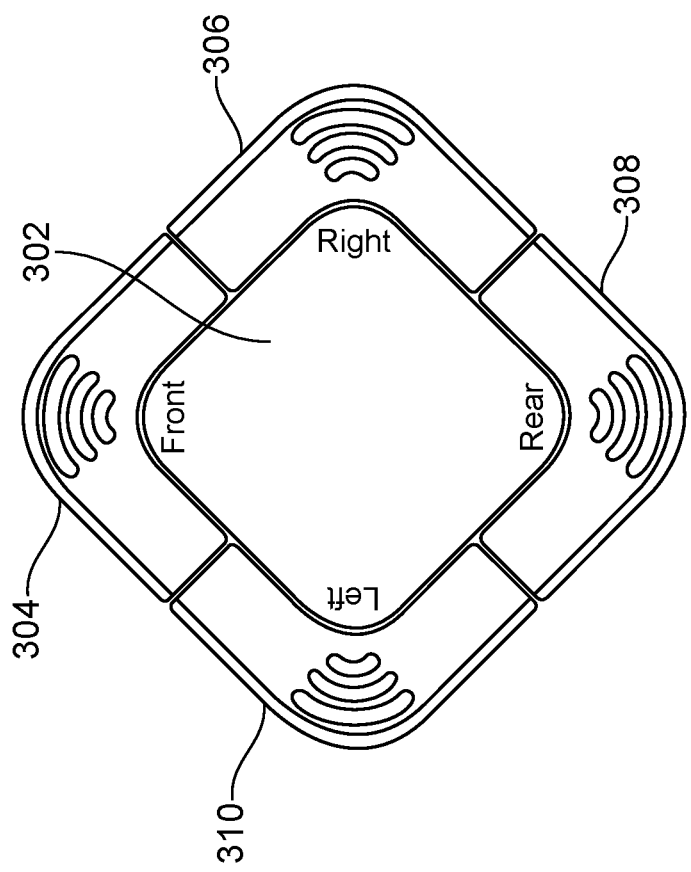
FIG. 4 illustrates a perspective view of the base module of the wireless vehicle leveling system in the standard position, in accordance with an embodiment of the present disclosure.

Referring now to FIG. 4, the base module 102 in the standard position is shown. The legs 304-310 are retracted to be housed within the housing 302 when the base module 102 is not used for leveling a vehicle. In the standard position, the four distal ends of the extendable legs circumscribe the housing 302.

Each extendable leg of the base module 102 may include more than one telescoping portion to extend the length of the legs and in some embodiments, all the legs are of same length and in other embodiments, the legs can be of different lengths.

Figure 5:
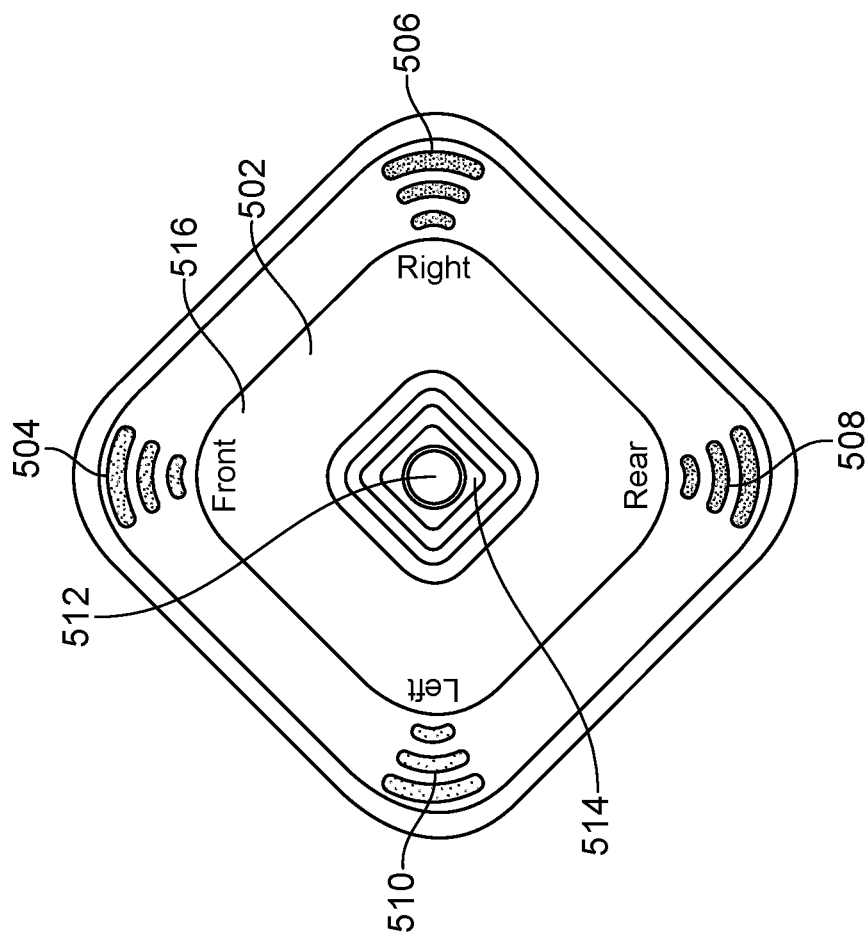
FIG. 5 illustrates a perspective view of the remote module of the wireless vehicle leveling system, in accordance with an embodiment of the present disclosure.

Referring now to FIG. 5, the remote module 104 is for user utilization, and serves as a means for monitoring the vehicle's leveling status. The remote module 104 works in conjunction with the base module 102 and provides the visual level status of the vehicle in which the base module 102 is placed. More specifically, the remote module 104 includes a corresponding housing 502 and includes four separate and independent LED indicators 504-510. The LED indicators 504-510 correspond to the LED indicators 318 disposed on the extendable legs 304-310 respectively of the base module 102.

More specifically, in the preferred embodiment, the LED indicator 504 corresponds to the LED indicator of the extendable leg 304 and indicates level of the vehicle in the front direction. Similarly, the LED indicator 506 corresponds to the LED indicator of the extendable leg 306 and indicates level of the vehicle in the right direction. The LED indicator 508 corresponds to the LED indicator of the extendable leg 308 and indicates level of the vehicle in the rear direction. Similarly, the LED indicator 510 corresponds to the LED indicator of the extendable leg 310 and indicates level of the vehicle in the left direction.

The replication of the LED indicator status of the extendable legs 304-310 in the LED indicators 504-510 of the remote module 104 provides consistency in the visual indication of the vehicle's leveling status, whether observed directly on the first module or remotely through the second module. This eliminates the requirement of the user to be physically present in the vehicle for leveling the vehicle.

Figure 6:
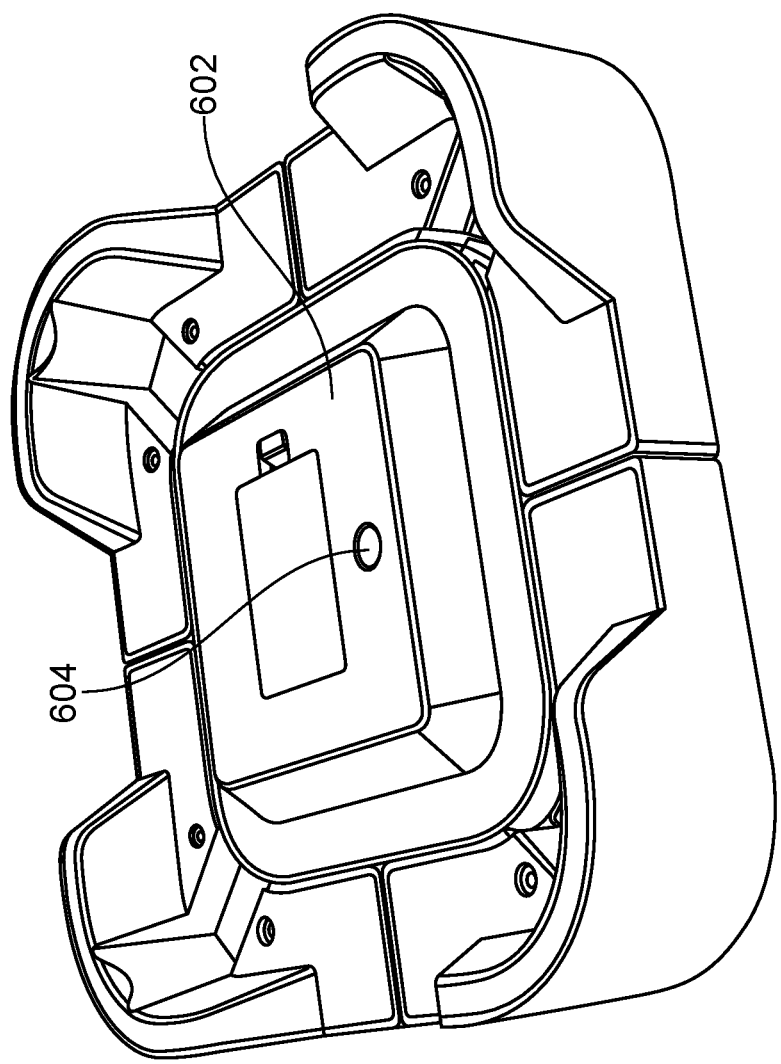
FIG. 6 illustrates a rear view of the base module 102 of the system 100 in accordance with one embodiment of the present invention.

FIG. 6 illustrates a rear view of the base module 102 of the system 100 in accordance with one embodiment of the present invention. The rear surface 602 of the base module 102 includes a power button 604. To initiate activation of the base module 102, the button 604 is pressed and held for a minimum duration of at least 2 seconds to turn on and off the base module 102. A short RED flashing light in the button 604 indicates that the base module 102 is turned on. A short Yellow flashing light in the button 604 indicates that the base module 102 is turned off.

In some embodiments of the present invention, the base module 102 may be recalibrated with precision and reliability to maintain accurate leveling measurements using the power button 604 disposed on the base module 102.

Referring again to FIG. 5, the remote module 104 can be turned on and off using a power button 512 positioned at the center 514 of the top surface 516 of the remote module 104. When the button 512 is pushed and held for 2 seconds, a RED flashing light indicates the activation of the remote module 104 and when again, the button 512 is pushed and held for 2 seconds, a Yellow flashing light indicates the deactivation of the remote module 104.

To save power of the base module 102 and the remote module 104, each module can be automatically shut off after being idle for a preconfigured timeframe, such as 20 minutes.

Figure 7:
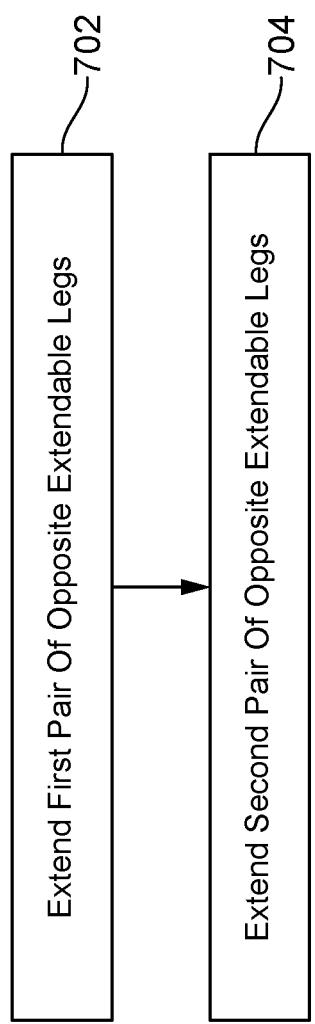
FIG. 7 illustrates a flow chart depicting a process of transitioning the base module into an extended position from the standard position for use in leveling of a vehicle in accordance with the disclosed structure.

FIG. 7 illustrates a flow chart depicting a process of transitioning the base module into an extended position from the standard position for use in leveling of a vehicle in accordance with the disclosed structure. For a precise level of a vehicle, the base module 102 is used in the extended position by extending the legs 304-310. For setting the base module 102 in the extended position, initially, distal ends of the two opposite extendable legs (out of the four legs) are pulled in opposite direction (away from the housing) to extend the corresponding legs (Step 702). Then, the remaining two opposite legs are extended in the opposite direction to extend the legs (Step 704) to set the base module 102 in the extended position.

Figure 8:
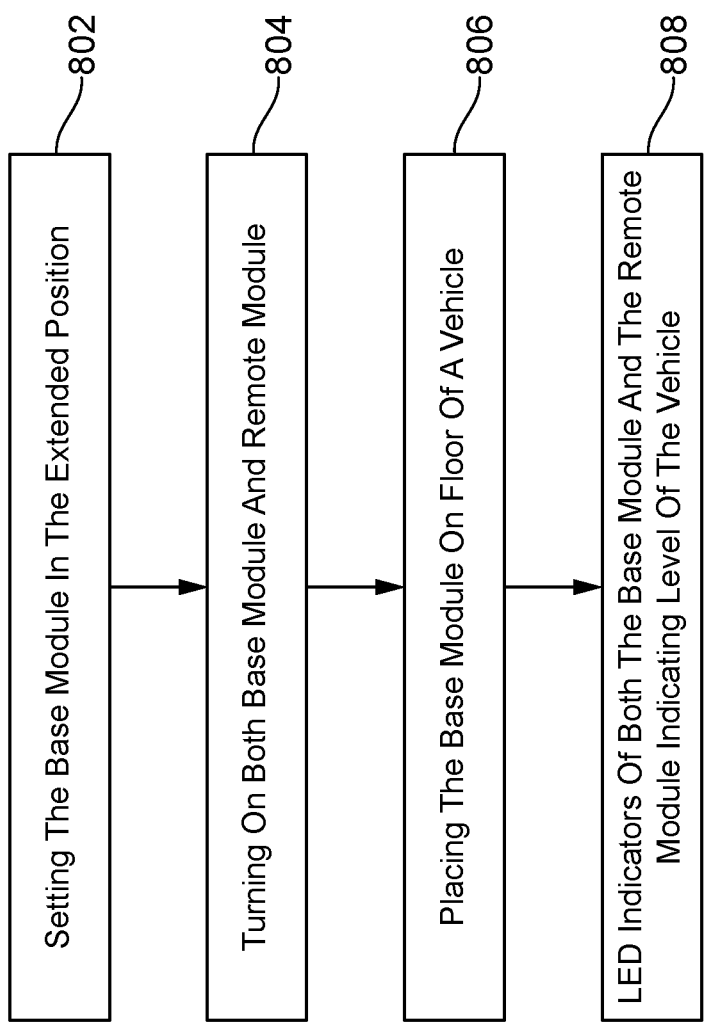
FIG. 8 illustrates a flow chart depicting a process of using the wireless vehicle leveling system 100 for monitoring leveling of a vehicle in accordance with the disclosed architecture.

FIG. 8 illustrates a flow chart depicting a process of using the wireless vehicle leveling system 100 for monitoring leveling of a vehicle in accordance with the disclosed architecture. Initially, the base module 102 is set into the extended position (Step 802) as described in FIG. 7. Then, both the base module 102 and the remote module 104 are turned on using the corresponding power buttons (Step 804). Thereafter, the base module 102 in the extended position is placed on the floor of a vehicle such as an RV (Step 806). The extended legs of the base module 102 points front to rear and left to right when the base module 102 is positioned on floor of the vehicle. The front leg face towards the front of the vehicle. Finally, when both the base module and the remote module are activated, the LED indicators on each leg and corresponding LED indicator of the remote module, indicates the height required in the corresponding direction to reach a perfect level position (Step 808). When all the indicator lights illuminate in Green color, then, the vehicle is level.

Figure 9:
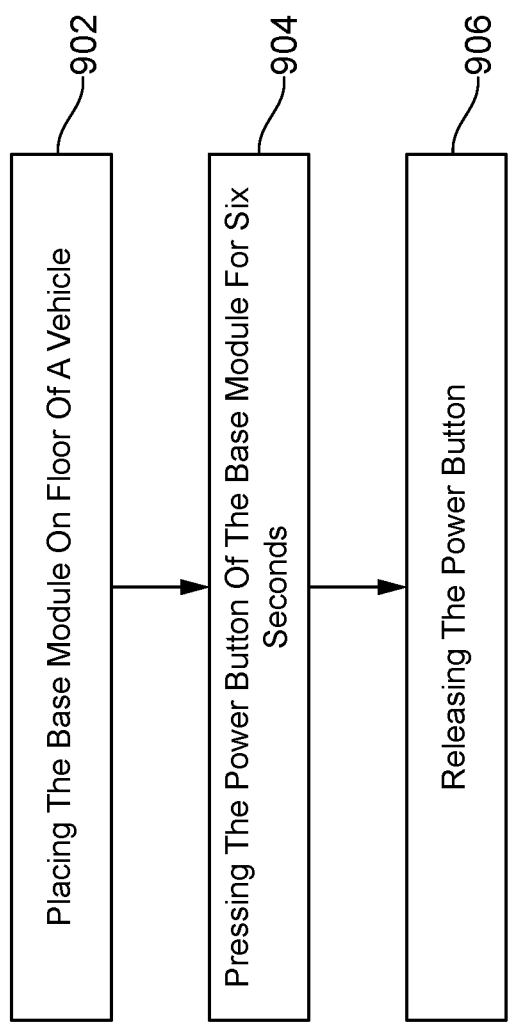
FIG. 9 illustrates a flow chart depicting a process of recalibration of the base module 102 in accordance with one embodiment of the present invention.

FIG. 9 illustrates a flow chart depicting a process of recalibration of the base module 102 in accordance with one embodiment of the present invention. Initially, the base module 102 is set in the extended position and is placed on a flat surface (Step 902). Then, for recalibration, the power button 604 of the base module 102 is pressed and held for a fixed time such as six seconds, until LED indicators on the "Left-Right" legs blink green (Step 904). Once the "Left-Right" legs blink green, then, the button 604 is released and LED indicators of all legs blink in green color indicates re-calibration of the base module (Step 906).

In preferred embodiment of the present invention, the remote module 104 can communicate with the base module 102 up to 70 feet. It will be apparent to a person skilled in the art that depending on the wireless communication technology, the distance can be more or less. Further, the remote module 104 may flash in red light indicating the remote module 104 is out of the range of the paired base module 102. Also, the remote module 104 automatically shuts off after two minutes when the remote module 104 is not in communication range with the base module 102.

In one embodiment of the present invention, each extendable leg can have one or more display screens. The display screens can be LED digital display screens and can be present in conjunction with the LED indicators. Each LED screen may indicate the leveling status of the vehicle in the predefined direction indicated by the extendable leg with numbers, LED colors or both. As an example, when the LED screen of a leg shows above 1.5 degrees, a red light may appear on the screen, yellow light may appear when 0.5-1.5 degrees is detected and green color may appear when level below 0.5 degrees is detected. The lights may appear separately in a portion of the screen or can be distributed throughout the whole screen to indicate change in the leveling status of the vehicle.

The LED screens can be positioned on the distal end of the extendable legs and can be positioned along the LED indicators. Also, the LED screens of the legs are independent and the remote module 104 may have the LED screens like the base module 102.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, and scope of this invention. Additionally, although relative terms such as "left," "right," "front," "rear," and similar terms have been used herein to describe a spatial relationship of one element to another, it is understood that these terms are intended to encompass different orientations of the various elements and components of the invention in addition to the orientation depicted in the figures. Further, as used herein, when a component is referred to as being "on" or "coupled to" another component, it can be directly on or attached to the other component or intervening components may be present therebetween.

The technical advantages offered by this disclosure are described below:

Portability and Ease of Use: The present disclosure provides a novel wireless vehicle leveling system that is highly portable, allowing users to effortlessly carry it from one vehicle to another without the need for complex installations or setup procedures. This portability significantly enhances user convenience and reduces the time required to initiate the leveling process.

Remote Monitoring: Users can conveniently monitor the leveling status of the vehicle from outside the vehicle using the remote module (i.e., second module). This feature provides real-time feedback and enables users to make leveling adjustments without repeatedly checking the base module (i.e., first module). Simultaneously, another person inside the vehicle can also view the leveling status directly on the base unit, enhancing coordination and safety during the leveling process.

Extendable Legs for Enhanced Accuracy: The incorporation of extendable legs within the system (i.e., first module) contributes to enhanced accuracy during the leveling process. As the legs extend, they provide a stable base, resulting in precise leveling measurements. This additional functionality ensures that the vehicle achieves a truly level position, reducing the risk of imbalance and enhancing overall safety and comfort during travel.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims and may include other examples that occur to those skilled in the art. Such other examples are intended to be within the scope of the claims if they have structural elements that do not differ from the literal language of the claims, or if they include equivalent structural elements within substantial differences from the literal languages of the claims.

What is claimed is:

1. A wireless vehicle leveling system, comprising:
   a base module, wherein the base module is placed on a floor of a vehicle and further comprises:
   a square central housing with rounded edges; and
   a set of four telescoping legs adapted to extend outwards from the central housing;
   wherein each telescoping leg comprises a telescoping longitudinal portion and a distal end that is curved to be secured by a corresponding rounded portion of the central housing;
   a set of light emitting diode ("LED") indicators, wherein one LED indicator is located on each distal end of each telescoping leg;
   each telescoping leg is extendable along a predefined direction, and the LED indicators on the distal end of each telescoping leg indicates a level status of the vehicle along the predefined direction;
   a remote module wirelessly connected to the base module and further comprises:
   a set of second LED indicators, wherein the second LED indicators of the remote module correspond to the set of LED indicators on the distal end of each telescoping leg of the base module.

2. The wireless vehicle leveling system of claim 1, wherein the vehicle is selected from at least one of: recreational vehicles (RVs), travel trailers, and campers.

3. The wireless vehicle leveling system of claim 1, wherein the base module is in a retracted position when each extendable leg is retracted.

4. The wireless vehicle leveling system of claim 1, wherein the base module is in an extended position when the plurality of extendable legs is extended outwards from the housing.

5. The wireless vehicle leveling system of claim 1, wherein the base module is positioned on the vehicle's floor in an extended position to level the vehicle.

6. The wireless vehicle leveling system of claim 1, wherein the remote module provides LED indicator illumination used to monitor the leveling status from outside of the vehicle.

7. The wireless vehicle leveling system of claim 1, wherein the one or more first LED indicators and the one or more second LED indicators are configured to indicate a red light when the vehicle is in an imbalanced position along a respective predefined direction.

8. The wireless vehicle leveling system of claim 1, wherein the one or more first LED indicators and the one or more second LED indicators are configured to indicate a yellow light when the vehicle is in close to a balanced position along a respective predefined direction.

9. The wireless vehicle leveling system of claim 1, wherein the one or more first LED indicators and the one or more second LED indicators are configured to indicate a green light when the vehicle is in a balanced position along a respective predefined direction.

10. The base module of claim 1, wherein each telescoping leg is in an extended position by pulling the distal end of the leg away from the housing.

11. The base module of claim 1, wherein the predefined directions comprise a right direction, a left direction, a front direction, and a rear direction.

12. The base module of claim 1, wherein the level status comprises vehicle's height level along each of the predefined directions.

* * * * *